Dec. 25, 1923. 1,478,720
J. M. WEBER
PROCESS OF MAKING ARTICLES HAVING CONNECTED LINKS
Filed Aug. 23, 1921 2 Sheets-Sheet 1
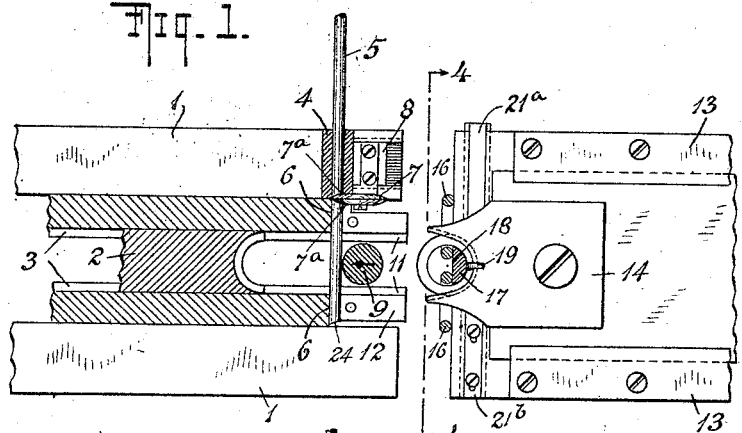
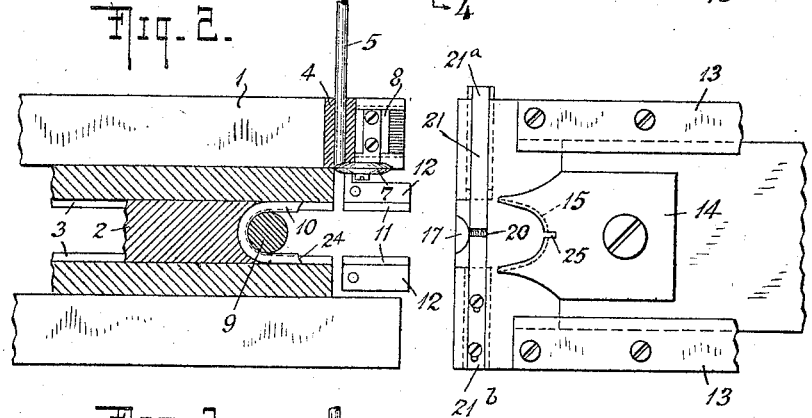
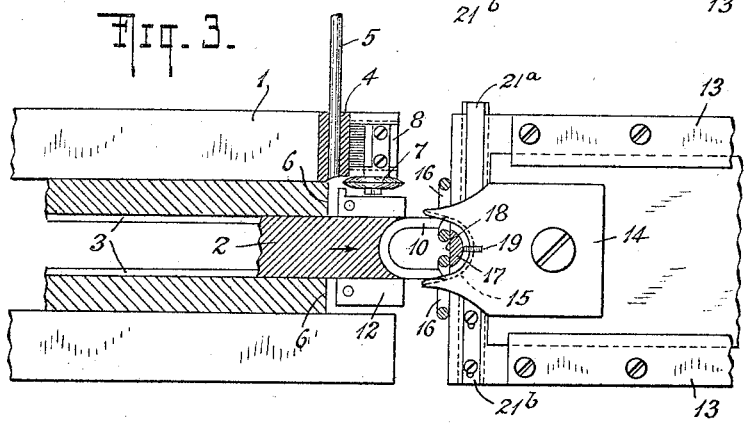
WITNESS
G. V. Rasmussen
INVENTOR
JOHANN MARTIN WEBER
BY
ATTORNEYS Dec. 25, 1923.　　　　　　　　　　　　　　　　　1,478,720
J. M. WEBER
PROCESS OF MAKING ARTICLES HAVING CONNECTED LINKS
Filed Aug. 23, 1921　　　2 Sheets-Sheet 2
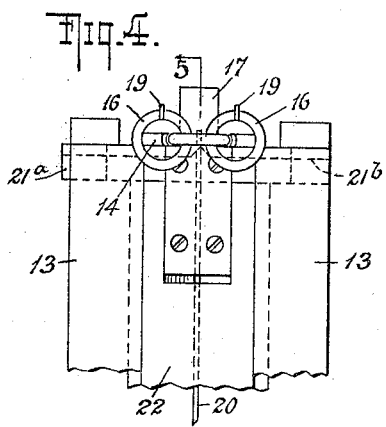
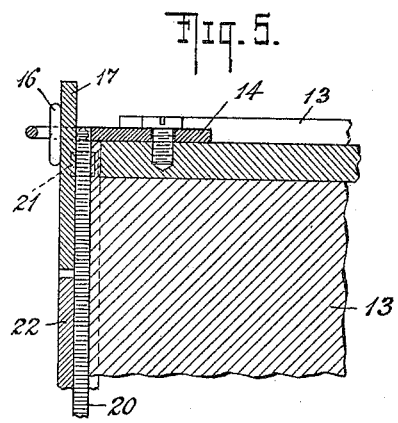
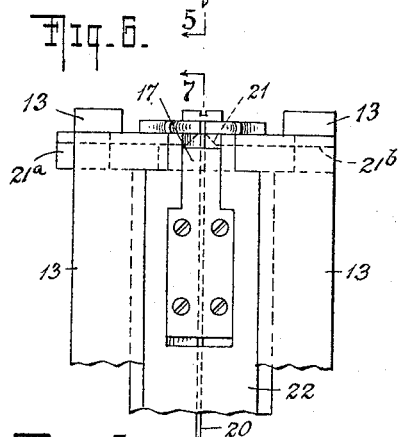
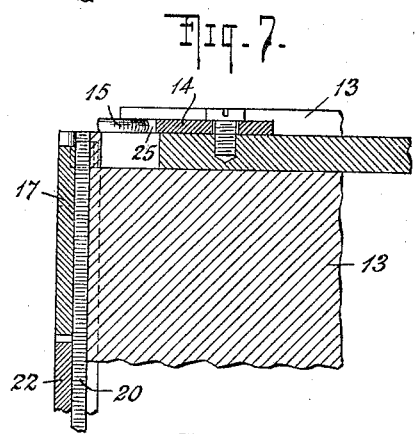
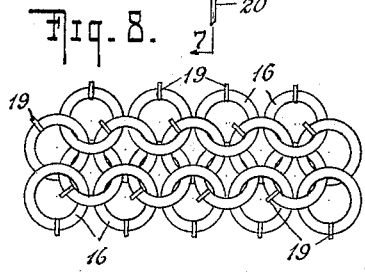
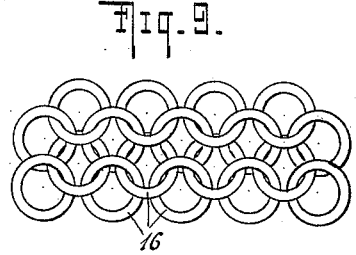
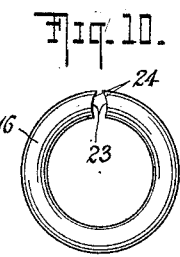
WITNESS:
*G. V. Rasmussen*
INVENTOR
JOHANN MARTIN WEBER
BY
*Briesen & Schrenk*
ATTORNEYS Patented Dec. 25, 1923.

1,478,720

UNITED STATES PATENT OFFICE.

JOHANN MARTIN WEBER, OF FRANKFORT-ON-THE-MAIN, GERMANY, ASSIGNOR TO ERNST GIDEON BECK, OF PFORZHEIM, GERMANY.

PROCESS OF MAKING ARTICLES HAVING CONNECTED LINKS.

Application filed August 23, 1921. Serial No. 494,551.

(GRANTED UNDER THE PROVISIONS OF THE ACT OF MARCH 3, 1921, 41 STAT. L., 1313.)

*To all whom it may concern:*

Be it known that I, JOHANN MARTIN WEBER, a citizen of the German Republic, and a resident of Frankfort-on-the-Main, Germany, have invented certain new and useful Improvements in Processes of Making Articles Having Connected Links (for which applications have been filed in Germany, June 24, 1916; Austria, April 16, 1917; Switzerland, April 17, 1917; Netherlands, January 15, 1920; Spain, February 3, 1920; Czechoslovakia, April 17, 1920; Poland, June 26, 1920; Sweden, January 28, 1920; Denmark, January 28, 1920; England, January 14, 1921; France, March 11, 1921; Hungary, February 18, 1921; Norway, February 14, 1921; Italy, February 2, 1921; and Belgium, January 7, 1921), of which the following is a specification.

The object of this invention is to produce an improved link or ring mesh fabric of great strength in which the individual links or rings have their ends firmly united, the union being so perfect that it is practically invisible to the eye. The invention is also applicable to the manufacture of other articles having connected links, for instance, chains.

Link mesh fabrics have been on the market for some time and have been made in a variety of ways. In some of the fabrics the rings are made of separate pieces of solid wire with the ends of the individual rings merely in surface contact and not secured together. This form of fabric was exceedingly objectionable when used commercially (for mesh bags, for instance) inasmuch as the ring ends merely abutting were quite insecure and consequently many of the rings would open and drop from the fabric. Efforts have also been made to weld the ring ends together, but this has been found impracticable chiefly because of the difficulty of producing a satisfactory article. It has also been a practice of forming the wire from metal tube filled with solder which is drawn to the desired thinness, thus producing a solder filled wire from which wire fabric was made. The fabric after completion was exposed to heat causing the solder to flux and flow from within the wire and join the ring ends. The process was exceedingly expensive and the fabric weak. In time links would wear through and often the wire melted during fluxing of the solder. All of these methods were objectionable for many reasons as well understood in the art. By this invention it is proposed to produce a much desired and acceptable product. In carrying out this invention a solid wire is preferably used with the ends of each ring quite close together and securely and solidly united by the solder at all points of the oppositely located faces thereof. The solder in the finished fabric does not protrude beyond the surface of the rings but makes the joint of the ring ends smooth and continuous with the surface of the rings.

In the drawings Figs. 1, 2 and 3 represent plan views of parts of a device by which this invention may be carried out, showing different positions of the mechanisms. Fig. 4 is an end view of the upper portion of the device on line 4—4 of Fig. 1. Fig. 5 is a vertical sectional view of the device on the line 5—5 of Fig. 4. Fig. 6 is a face view similar to Fig. 4 with the parts in different relative position. Fig. 7 is a vertical section on the line 7—7 of Fig. 6. Fig. 8 is an enlarged plan view of a portion of mesh fabric after it is removed from the fabric forming device and before the links are soldered. Fig. 9 is an enlarged plan view of a portion of the completed mesh fabric after the ends of the individual rings or links have been soldered together. Fig. 10 is a greatly enlarged end view of one of the individual links shown in Fig. 8 with the solder removed.

This invention may be carried out in a machine of any type, but preferably in machines that operate automatically, such for instance as are shown in United States Patents No. 994,987 to Dollinger & Bischoff, dated June 13, 1911, or No. 1,078,317 to H. W. and C. G. Smith, dated November 11, 1913, with such modification thereof as will insure the proper handling and insertion of the soldering material. Such machines may have incorporated therein the devices shown in the drawings hereto with such modifications as are necessary to bring about a proper functioning of the operating parts.

In the practice of this invention the wire from which the rings are to be formed is drawn from a spool to a cutting and forming mechanism where the wire is cut into suitable lengths or blanks and a thin piece of solder is secured between the two ends of each link. After a sheet of fabric of the desired size has been produced, the solder is fluxed and the ends of each ring are securely soldered together along all portions of the adjoining ring ends. The joint formed in each ring is very strong and regular and hardly visible to the naked eye.

In the drawings illustrating how this invention may be carried out, 1 is a block, having a slide 2 therein which is adapted to reciprocate in the channels 3. The block 1 has a bushing 4 therein through which the wire 5 is fed into the path of the slide 2. The wire 5, it will be noted, is fed into the path of the slide with portions thereof resting upon the walls 6—6, with the end of the wire abutting against the block 1 and the point at which it is to be cut under the knife 7. The knife 7 on slide 8 is adapted to move downwardly and sever a section of wire or a blank equal to the length of a link. The sides 7ª of the knife 7 are curved or convex so that the cut ends of the wire are slightly bevelled and have slight concave depressions therein. This may be done in any desired way and can be accomplished by merely holding the wire rigidly during the cutting operation. The exact form of the cut is immaterial. It may be straight, bevelled or irregular but it has been found that the form of cut above described is preferable. After the wire is cut the pin 9 moves against the wire and forces the wire into the channels 3 and thereby forms an open link or staple 10, having the configuration of a U. The slide 2, after the pin 9 has been withdrawn from the staple 10 and out of the path of the slide 2, moves forward and pushes the open link 10 or U through the channels 11 in the vertically moving guides 12 and toward the frame 13 which carries the slide 14 adapted to move toward and away from the slide 2. The slide 14 has formed at the end thereof a semi-circular groove 15 which co-operates with the slide 2 to complete the formation of a ring as the ring is pressed between them. The advancing slide 2 (Fig. 3) thrusts the points of the open link into two adjoining rings 16 of a section of link mesh fabric. A center former 17 rises and takes a position between the slide 14 and the rings 16 and as the slides 2 and 14 move together, assists in properly forming the link and provides, by reason of its flat face 18, a rest for the two rings 16. The portion of the link forming mechanism (not including the wire cutting device) as explained up to this point, is substantially like that shown in the aforementioned patent to H. W. and C. G. Smith.

Those features of my invention which have not been disclosed in the foregoing paragraph will now be explained. I insert between the ends of each link a piece of proper soldering material 19. The solder may, of course, vary in thickness, but I prefer to use it of flake-like thinness and have succeeded in utilizing solder which is of the thinness of writing paper, i. e. about 0.02 mm. The solder is severed from a ribbon 20 which is drawn from a suitable roll (not shown) and is fed step by step by a suitable device such as gear wheels (not shown) to the knife 21 where the desired length is cut off. The ribbon of material passes through a channel in the slide 22 which carries the center former 17 and when the slide 22 moves upwardly the ribbon of material 20 is fed to expose a flake of solder to the knife. While the slide 22 is moving downwardly after the completion of a ring, the ribbon 20 is held stationary. The slide 14 has a slot 25 therein which crosses the groove 15. As the slide 14 moves to meet the on-coming slide 2, the exposed portion of the ribbon to be cut is embraced by the slot 25. The groove 15 of the slide 14 then commences to complete the formation of the link and the exposed portion of the ribbon 20 is severed by the sliding blade 21ª and fixed blade 21ᵇ of the knife 21. The piece or flake of solder 19 retains its position in the groove 25 and when the ends of the link come together, they grasp the flake of solder and retain it. It is preferred to have the ribbon of solder of a slightly greater diameter or width than the diameter of the wire constituting the links, so that there is a slight amount of solder extending beyond the oppositely located faces of the link ends (see Fig. 8).

After the completion of a desired length of fabric the sheet is removed from the machine and the solder is caused to flux by any suitable arrangement in order to form a solid union between the adjoining ends of each link. Upon exposure to heat, for the purpose of causing the solder to flux, the solder acts very peculiarly. That portion of the solder which extends beyond the surface of the ring is drawn or passes between the adjoining faces of the ends of the link and insures, with that portion of the solder which is initially positioned between the ring ends, a complete union of the ends and make a smooth union entirely around the ring ends. It appears during the fluxing of the solder as if there were capillary action particularly on that portion of the solder which is exposed around the ring ends but whatever action takes place, the exposed portion of the solder moves toward the ring and forms part of the joint between the ends. The finished rings have a solid and continuous union with an exceedingly thin but compact binder or film of solder between them. The adjoining surfaces of the ring or link ends are united at all points and the joints are smooth and perfect.

It must be understood that this invention, although it may be used generally in the ring or link mesh art, has particularly to do with forming mesh from wire of gauge running between .08 to .15 of an inch, the rings being from 1.5 mm. to 3.5 mm. in diameter, while the flakes of solder are of thinness commencing with 0.02 mm. An examination of a sheet of mesh in the form shown in Fig. 8 (i. e. before the solder is fluxed) discloses that some of the solder is quite firmly held between the ring ends while in other instances by a very slight pressure on the exposed portion of the solder, it may be moved around between the adjoining faces of the ring ends, but in all cases, the flakes are retained in place.

In Fig. 10 one of the rings is shown very much enlarged and in which the peculiar and preferred cut of the wire is exaggerated. By reference to this figure, it will be noted that the ring, beside having a bevelled cut 24, also has a slight depression 23 therein.

I claim:

1. In the process of forming articles having connected links, the steps which consist in bending the ends of a metal blank toward each other, positioning an exceedingly thin piece of solder between said bent ends so that said piece of solder occupies substantially all of the cross-sectional space between said ends, closing the ends of the blank upon the solder so that a capillary space is formed between the ends of said blank, the said ends constituting the sole retaining means for the solder, causing the solder to become fluid in the capillary space whereby, by reason of the previous confinement of the solder in said space, the fluid solder is retained properly positioned in said space and finally causing the solder thus positioned to assume its final set.

2. In the process of forming articles having connected links, the steps which consist in bending the ends of a metal blank toward each other, positioning a piece of solder between said bent ends with the extremity of said piece of solder substantially flush with the interior surface of the blank, closing the said ends upon the solder so that a capillary space is formed between the ends of said blank, the said ends constituting the sole retaining means for the solder inserted therebetween, causing the solder to become fluid in the capillary space whereby, by reason of the previous confinement of the solder in said space, the fluid solder is retained properly positioned in said space and finally causing the solder thus positioned to assume its final set.

3. In the process of forming articles having connected links, the steps which consist in bending the ends of a metal blank toward each other, inserting a piece of solder, of an area at least equal to the cross sectional area of one end of the metal blank, between the bent ends of said metal blank, closing the ends of the blank upon the solder so that a capillary space is formed between the ends of said blank, the said ends constituting the sole retaining means for the solder, causing the solder to become fluid in the capillary space whereby, by reason of the previous confinement of the solder in said space, the fluid solder is retained properly positioned in said space and finally causing the solder thus positioned to assume its final set.

4. In the process of forming articles having connected links, the steps which consist in bending the ends of a metal blank to link formation, positioning the tip of a solder strip between the ends of said blank to a sufficient distance to cause the tip of the solder strip to separate all portions of the opposing end surfaces of said blank, closing the ends of said blank upon the said tip, so that a capillary space is formed between the ends of the said blank, severing the said tip from the solder strip, the said ends constituting the sole retaining means for the said tip, causing the solder to become fluid in the capillary space and, by reason of the previous confinement of the solder in said space, the fluid solder is retained properly positioned in said space and finally permitting the solder thus positioned to assume its final set.

5. In the process of forming articles having connected links, the steps which consist in bending the ends of a metal blank to link formation, positioning an exceedingly thin piece of solder of approximately 0.02 mm. thickness, between said bent ends, with the extremity of said piece of solder substantially flush with the interior edge of the blank, closing the said ends against opposite surfaces of said piece of solder so that a capillary space is formed between the ends of said blank, said ends constituting the sole supporting means for the solder, the piece of solder forming a partition separating said ends, causing the solder to become fluid in the capillary space whereby, by reason of the previous confinement of the solder in said space, the solder is retained in said space and finally causing the solder thus positioned to assume its final set.

6. In the process of forming articles having connected links, the steps which consist in bending the ends of a metal blank to substantially U formation, inserting one of the ends of said U shaped blank between the ends of a previously formed link, bending the ends of said U shaped blank toward one another, inserting a piece of solder in the path of said bent ends with the extremity of said piece of solder substantially flush with the interior surface of the blank, closing the ends of the blank upon the solder so that a capillary space is formed between the ends of said blank, said ends constituting the sole retaining means for the solder, causing the solder to become fluid in the capillary space whereby, by reason of the previous confinement of the solder in said space, the fluid solder is retained properly positioned in said space and finally causing the solder thus positioned to assume its final set.

In witness whereof I have hereunto set my hand this 30th day of July, 1921.

JOHANN MARTIN WEBER.